(12) United States Patent
Plantan et al.

(10) Patent No.: US 8,783,427 B2
(45) Date of Patent: Jul. 22, 2014

(54) AIR DISC BRAKE ADJUSTER FOR IMPROVED RUNNING CLEARANCE

(71) Applicant: Bendix Spicer Foundation Brake LLC, Elyria, OH (US)

(72) Inventors: Ronald S. Plantan, Elyria, OH (US); Richard L. Lantz, Jr., Clinton, OH (US); Dennis A. Wolf, Westlake, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 13/691,241

(22) Filed: Nov. 30, 2012

(65) Prior Publication Data

US 2014/0151163 A1 Jun. 5, 2014

(51) Int. Cl.
*F16D 65/62* (2006.01)
(52) U.S. Cl.
USPC .................................. 188/196 BA; 188/196 B
(58) Field of Classification Search
USPC ................ 188/71.8, 196 B, 196 BA
See application file for complete search history.

(56) References Cited

U.S. PATENT DOCUMENTS

| | | | |
|---|---|---|---|
| 3,682,279 A | 8/1972 | Palme et al. | |
| 3,837,437 A | 9/1974 | Martins | |
| 4,014,411 A | 3/1977 | Troester | |
| 4,031,985 A | 6/1977 | Ito | |
| 4,380,276 A | 4/1983 | Sweet et al. | |
| 4,491,203 A | 1/1985 | Monick | |
| 4,620,617 A * | 11/1986 | Weber .................... | 188/196 BA |
| 5,582,273 A | 12/1996 | Baumgartner et al. | |
| 2010/0122879 A1 | 5/2010 | Louis et al. | |
| 2011/0155518 A1 | 6/2011 | Iraschko | |
| 2012/0043175 A1 | 2/2012 | Louis | |

FOREIGN PATENT DOCUMENTS

| | | |
|---|---|---|
| DE | 10 2008 028 265 A1 | 12/2009 |
| GB | 1 462 180 | 1/1977 |
| GB | 2 332 027 A | 6/1999 |

OTHER PUBLICATIONS

European Search Report dated Apr. 14, 2014 (five (5) pages).

* cited by examiner

*Primary Examiner* — Christopher Schwartz
(74) *Attorney, Agent, or Firm* — Crowell & Moring LLP

(57) ABSTRACT

A wear adjuster, securable to disc brake caliper structure includes, a stem extending along an axis about which the stem is rotatable in opposite directions, a spindle driver securable to an axial end of the stem to transmit rotational motion of the stem to an adjusting spindle, and an input element receiving input force supplied to the wear adjuster to produce rotation of the stem. A running clearance element is rotatable together with the input element to a limited extent, and a ratchet arrangement, located between the input element and the running clearance element, initiates any necessary adjustment for wear after rotation of the input element beyond the limited extent, and completes such adjustment during return rotation of the input element. To avoid transmitting an excessive amount of the input force received by the input element, a lost motion connection is defined between the ratchet arrangement and the input element.

20 Claims, 10 Drawing Sheets

AIR DISC BRAKE ADJUSTER FOR IMPROVED RUNNING CLEARANCE

BACKGROUND OF THE INVENTION

1. Field of the Invention

The present invention provides an improved wear adjuster, acting in conjunction with adjusting spindle operation in a disc brake, that is usable as an alternative to a typical wear adjuster of this type.

2. Description of Related Art

U.S. Patent Application Publication 2011/0155518 A1 to Iraschko discloses a disc brake including a wear adjuster that is insertable into a threaded adjusting spindle and attachable to a caliper of the disc brake. Published United Kingdom Patent Application 2 332 027 A to Baumgartner discloses a disc brake including a wear adjuster of a different sort that is also insertable into a threaded adjusting spindle attachable to a caliper of the disc brake. The disclosures of both the Iraschko ('518) publication and the Baumgartner ('027) application are incorporated herein in their entireties as non-essential subject matter.

U.S. Pat. No. 3,682,279 to Palme et al., U.S. Pat. No. 3,837,437 to Martins, U.S. Pat. No. 4,014,411 to Troester, U.S. Pat. No. 4,031,985 to Ito, U.S. Pat. No. 4,380,276 to Sweet et al., U.S. Pat. No. 4,491,203 to Monick, U.S. Pat. No. 5,582,273 to Baumgartner et al., U.S. Patent Application Publication 2010/0122879 A1 to Louis et al., U.S. Patent Application Publication 2012/0043175 A1 to Louis, and British Patent Specification 1 462 180 to Reeders may also be of interest.

Over-adjustment of wear-compensating adjusters, at times, can lead to rapid wear on vehicle wheel ends, as well as to high temperatures.

SUMMARY OF THE INVENTION

In one preferred configuration, a wear adjuster, securable to disc brake caliper structure includes, a stem extending along an axis about which the stem is rotatable in opposite directions, a spindle driver securable to an axial end of the stem to transmit rotational motion of the stem to an adjusting spindle, and an input element receiving input force supplied to the wear adjuster to produce rotation of the stem. A running clearance element is rotatable together with the input element to a limited extent, and a ratchet arrangement, located between the input element and the running clearance element, initiates any necessary adjustment for wear after rotation of the input element beyond the limited extent, and completes such adjustment during return rotation of the input element. To avoid transmitting an excessive amount of the input force received by the input element, a lost motion connection is defined between the ratchet arrangement and the input element.

The ratchet arrangement disclosed includes a middle bushing disposed between opposing bushings that are displaceable axially relative to the stem. Teeth of the opposing bushings are spring biased into engagement with teeth on opposite sides of the middle bushing. The teeth in facing teeth sets are preferably configured to permit one way indexing.

In a preferred configuration, the lost motion connection is provided by an arrangement including a pin and a slot. A torsion spring opposes relative movement of the pin and the slot upon disc brake actuation.

The limited extent to which the running clearance element and the input element are rotatable together is defined by movement of a pin within a slot defined in the running clearance element. This pin is secured to a mounting plate by which the wear adjuster is securable to the disc brake caliper structure. To permit large pad clearances for brake pad inspection, removal, and replacement, the rotatable stem is axially displaceable relative to the ratchet arrangement to unlock the stem for free stem rotation.

By way of the present invention, a low cost, bi-directional adjuster, capable of returning brake pads to their original clearances, is provided. Increased pad-to-rotor running clearance is made available without increasing a brake chamber stroke. The invention also divorces the adjuster from influences of bridge clearance, threaded tube inner diameter clearance, and pad-kick issues on brake overadjustment.

BRIEF DESCRIPTION OF THE DRAWING FIGURES

DETAILED DESCRIPTION OF THE INVENTION

Figure 1:
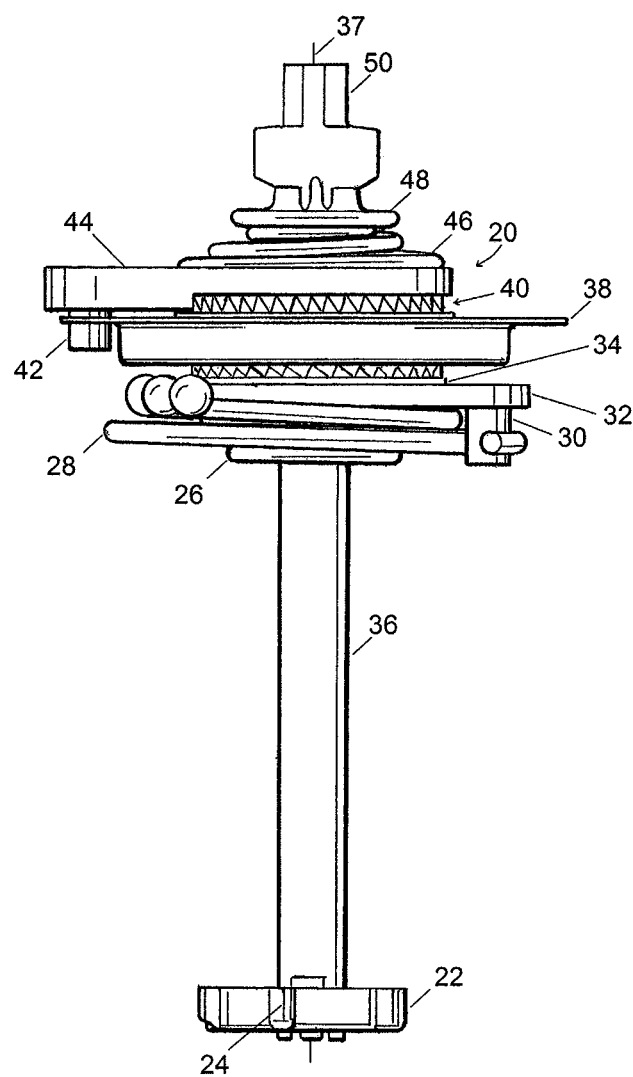
FIG. 1 is a side view of a disc brake wear adjuster according to the invention.

FIG. 1 is a side view of an improved air disc brake wear adjuster 20 usable as an alternative to the adjusting spindle operating components of either the Iraschko ('518) wear adjuster or the Baumgartner ('027) wear adjuster. The adjuster 20 includes a spindle driver 22 with projections 24 distributed around its outer circumference. It will be recognized by those familiar with brake disc technology that the projections 24 are intended to cooperate with corresponding grooves distributed about the circumferential interior of a threaded adjusting spindle in an arrangement such as that of either the Iraschko ('518) publication or the Baumgartner ('027) application. The relationship of the projections and grooves could be reversed, of course, with the adjusting spindle being provided with projections rather than grooves, and the spindle driver being provided with grooves rather than projections. The spindle driver 22 is non-rotatably secured by press-fitting, welding, or in any other appropriate manner to a first axial end of a driver stem or shaft 36. The stem 36 is rotatable in opposite directions about an axis 37 along which it extends.

Most of the remaining wear adjuster components are located adjacent a second axial end of the stem 36 opposite the first axial end mentioned. Although a detailed discussion of these remaining wear adjuster components will be supplied in connection with drawing figures other than FIG. 1, visible in FIG. 1 are an end flange 26 of a middle ratchet tube, a torsion spring 28 secured, at an outermost end, to a torsion spring pin 30 rigidly secured or integrally formed with a lever force receiving input element 32, and an insert 34, receivable within a cup-shaped recess defined in the input element 32 for rotation relative to that element 32 under conditions to be described. Also visible in FIG. 1 are a mounting plate 38, by which the overall adjuster is secured to the disc brake caliper (not shown), a ratchet arrangement 40, an adjuster pin 42 secured to the disc brake caliper and also secured to or forming part of the mounting plate 38, and a pad running clearance element 44 including a slot (to be described) receiving the adjuster pin 42. A pair of opposing, axially acting cone springs 46, 49 operates to bias teeth of the ratchet arrangement 40 into engagement, although only one of these cone springs, the spring 46, is visible in FIG. 1. A "T-cap" abutment 48 is non-rotatably secured to the second axial end of the stem 36, and a cam driver 50 is shown as overlying an end of the T-cap abutment. The cone spring 46 is disposed between a first seat, formed by an underside of the T-cap abutment 48, and a second seat, formed by a surface of the running clearance element 44. The manner in which the wear adjuster components mentioned function and cooperate will become apparent.

Figure 2:
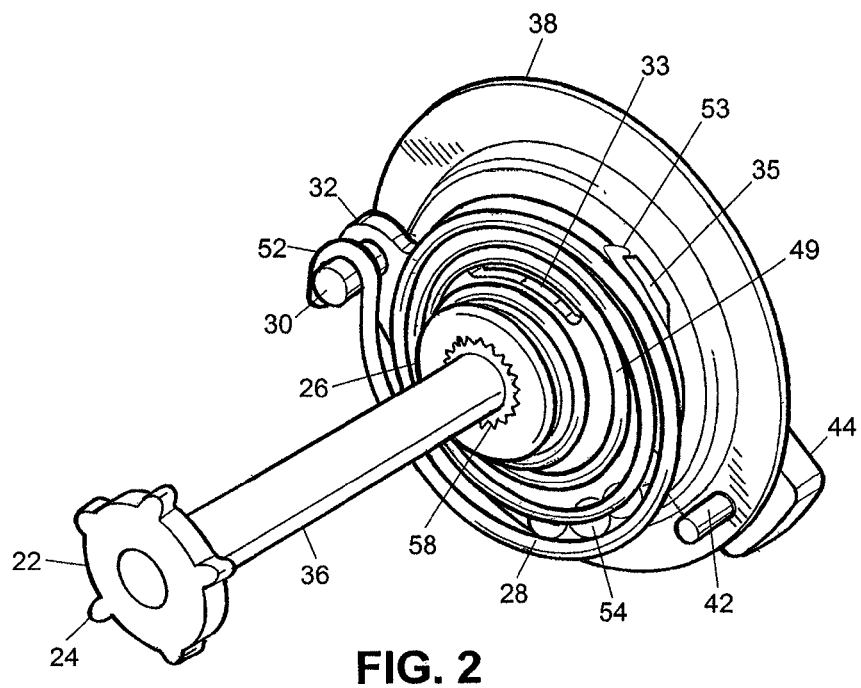
FIG. 2 is a view, in perspective, from below the adjuster illustrated in FIG. 1.

FIG. 2, which is a perspective view from below the arrangement illustrated in FIG. 1, illustrates the radial outermost end 52 of the torsion spring 28 as wrapped around the torsion spring pin 30 to secure that end 52 in position with respect to the input element 32. The radial innermost end 53 (FIGS. 2 and 4) of the spring 28 is hooked over a projection 35 of the insert 34. Lever input force from an adjuster arm is supplied to the element 32 by way of connectors 54 or in any other suitable fashion, and serves to rotate the element 32 about the axis of the stem 36. A lost motion slot 33 forms an, open arc in the input element 32 and receives a pin to provide a lost motion connection in a manner to be described upon contact between the disc brake pads and the disc brake rotor. The adjuster pin 42 is shown as fixed within a hole formed in a circumferential flange of the mounting plate 38, and the cone spring 49 is shown as mounted between a seat defined by the end flange 26 of the middle ratchet tube and a face of the input element 32 so as to apply a force opposing that applied by the spring 46. A cone lock 58, defined by cooperating teeth and recesses, is used to secure the driver stem 36 and the middle ratchet tube including the end flange 26 together for rotation as a unit during normal brake operation.

Figure 3:
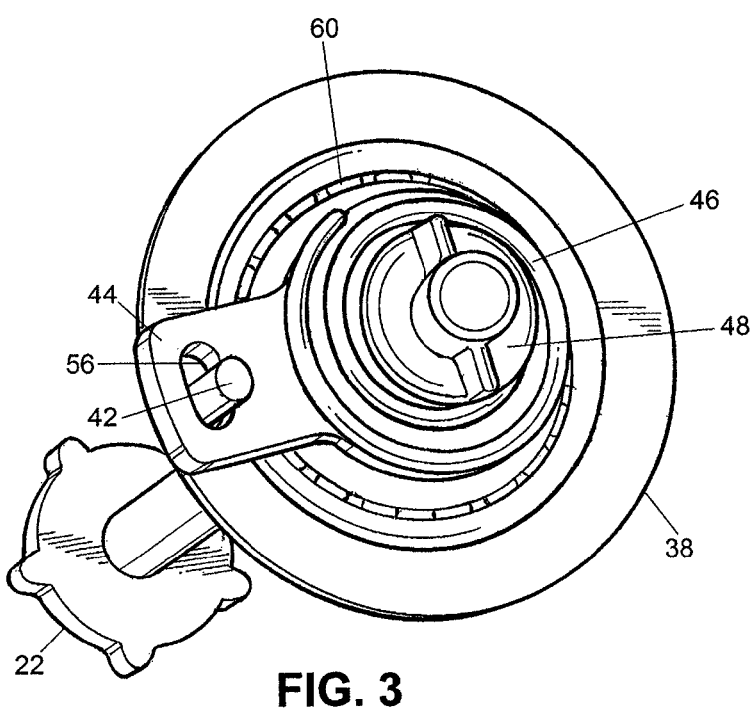
FIG. 3 is a view, in perspective, from above the adjuster illustrated in FIG. 1.

FIG. 3 is a perspective view from above the arrangement illustrated in FIG. 1, and shows a slot 56 in the running clearance element 44. The adjuster pin 42 projects from the mounting plate 38 into or through this slot 56. Relative rotational displacement between the mounting plate 38 and the running clearance element 44 is thus constrained to the circumferential extent of the slot 56. As will become clear, brake pad to rotor clearance is defined by the circumferential slot dimension. Bearings 60 are disposed in races respectively secured to or formed by the mounting plate 38 and a middle ratchet, to be described.

Figure 4:
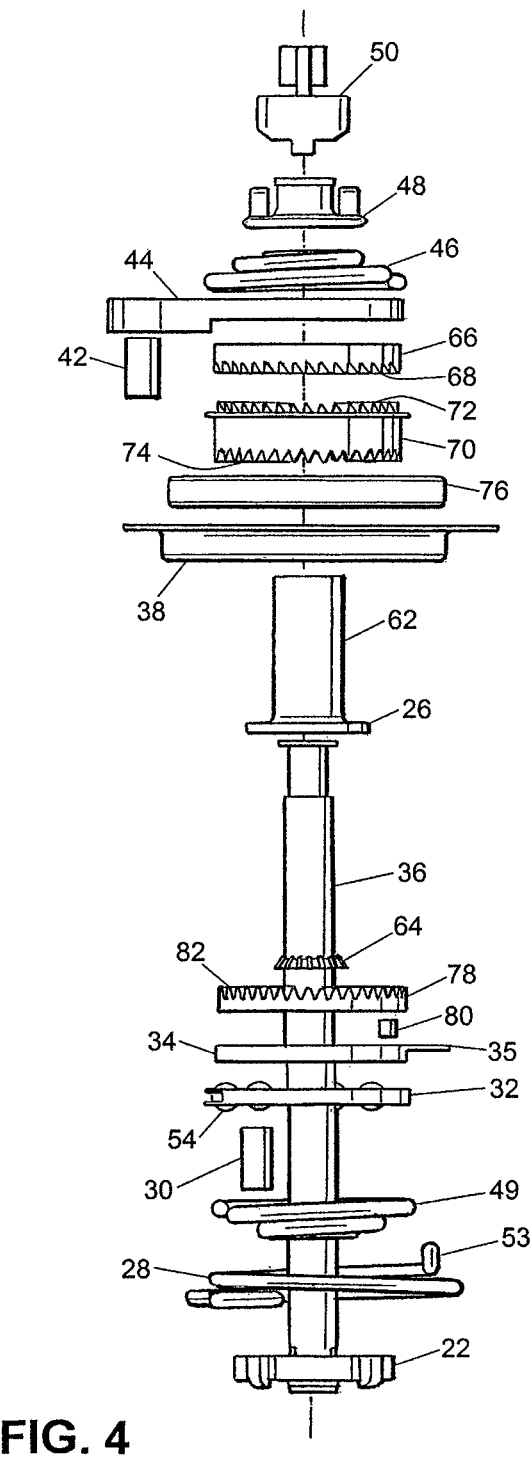
FIG. 4 is an exploded view illustrating certain relationships among elements composing the adjuster of FIG. 1.

Certain relationships among the elements mentioned above are apparent from the exploded view provided by FIG. 4. The upper portion of FIG. 4 illustrates the cam driver 50, the T-cap abutment 48, the cone spring 46, the running clearance element 44, the adjuster pin 42, the mounting plate 38, and an overall middle ratchet tube 62, including the end flange 26 mentioned previously, while the lower portion of FIG. 4 illustrates the stem 36, teeth 64 on the stem 36 forming part of the cone lock 58, the insert 34, the input element 32, the pin 30 for the torsion spring 28, the cone spring 49, and the driver 22 for the adjusting spindle. It will be recognized that the interface between the tube 62 and the teeth 64 creates the cone lock 58, and that the adjuster pin 42 is secured to the caliper to preclude rotational movement of the mounting plate 38.

Also shown in FIG. 4 are a first or top ratchet bushing 66, including angled, partly angled, or otherwise contoured first bushing teeth 68 on one axial side, at least one second or middle ratchet bushing 70, to be non-rotatably affixed or attached to the outside of the middle ratchet tube 62 and including two sets 72, 74 of angled, partly angled, or otherwise contoured middle bushing teeth on opposite axial sides, a bearing assembly 76, fixable to the mounting plate 38 and including the bearings 60 shown in FIG. 3, and a third or bottom ratchet bushing 78, mountable within a recessed portion of the insert 34 and including angled, partly angled, or otherwise contoured bushing teeth 82 on one axial side. It will thus be understood that the overall ratchet arrangement mentioned includes the first ratchet bushing 66, the second ratchet bushing 70, the third ratchet bushing 78. A pin 80, secured to both the insert 34 and the third ratchet bushing 78, is additionally shown. This pin 80 travels within the lost motion slot 33 in the input element 32 mentioned previously, such that the pin 80 and the slot 33, together, form a lost motion connection providing action discussed above when contact between the brake pads and the rotor occurs.

Figure 5:
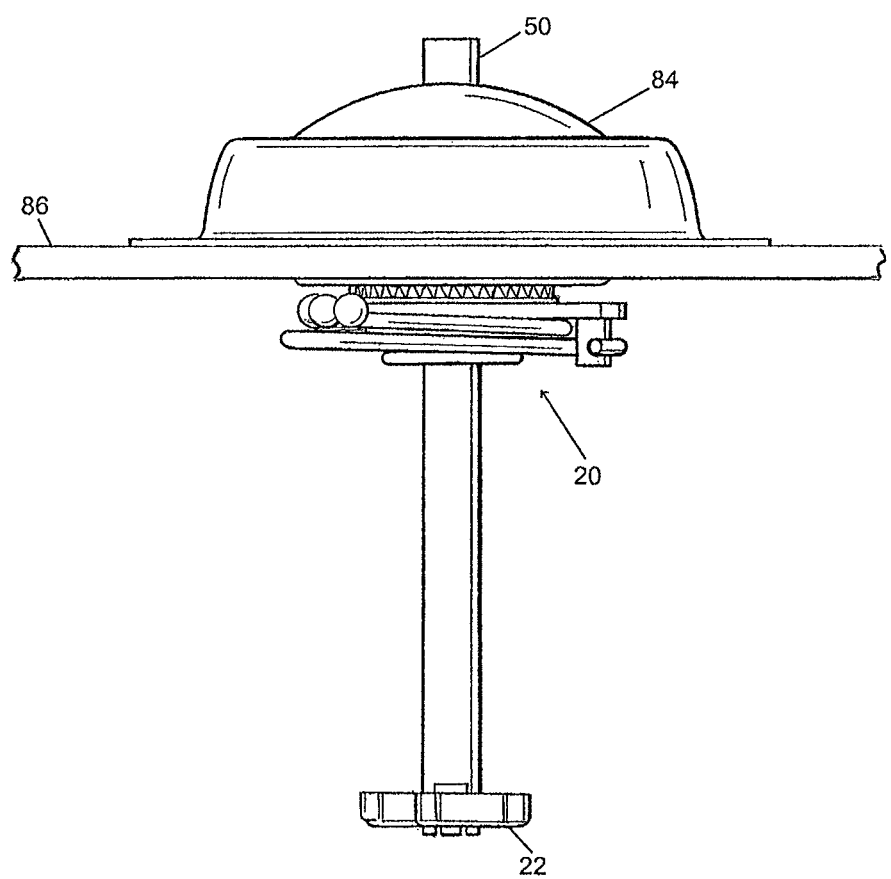
FIG. 5 is a view of the overall disc brake wear adjuster when secured to a brake caliper structure, with a protective cover disposed over elements located on an exterior side of the structure.
Figure 6:
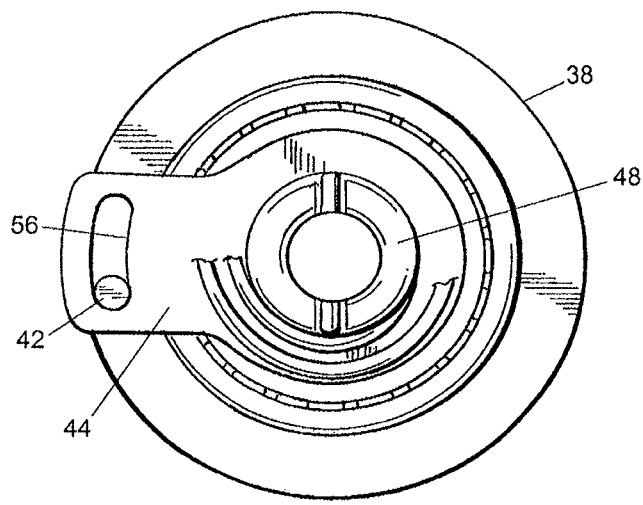
FIG. 6 is an end view from above the adjuster shown in FIG. 1 in a zero stroke position.
Figure 7:
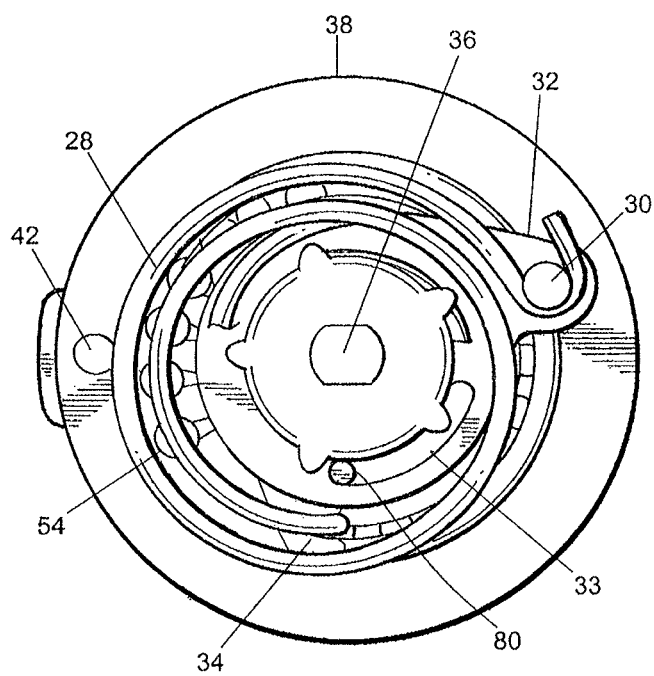
FIG. 7 is an end view from below the adjuster shown in FIG. 1 in the same zero stroke position.

FIG. 5 illustrates the overall air disc brake wear adjuster 20 as secured, by way of the mounting plate 38 (FIG. 4), to an appropriate wall, flange, or similar structure 86 forming part of or secured to the brake caliper. A protective cover 84 is secured to the structure 86 over elements located on an exterior side of the structure, and an end of the cam driver 50 projects through an aperture in the cover 84 so as to be accessible by a tool for manual adjustment of the spindle driver 22.

Operation of the disc brake wear adjuster 20 is now described with reference to FIGS. 6-11, which illustrate various positions taken by elements of the adjuster described above in different phases of normal use.

Figure 8:
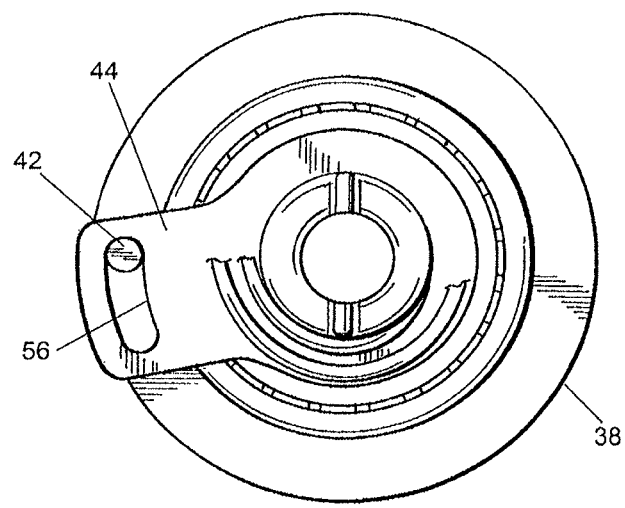
FIG. 8 is an end view similar to FIG. 6 but showing component positions when brake pad to brake rotor contact occurs.
Figure 9:
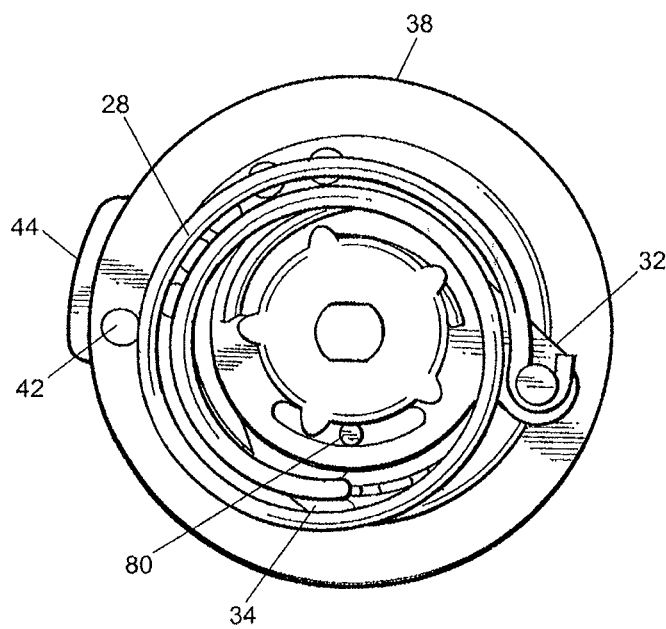
FIG. 9 is an end view similar to FIG. 7 but showing component positions when brake pad to brake rotor contact has occurred and overload is being taken up.

Initial running clearance take-up, occurring as the distance between a brake pad and the rotor of the disc brake approaches zero, is discussed first. Lever input force is supplied by an adjuster arm to the input element 32 via connectors 54 during movement of a brake chamber pushrod, as with disc brake assemblies in use currently. In the absence of any significant opposing force, all remaining elements of the adjuster 20 turn as a unit with rotation of the element 32, and tappets operate to engage the brake pad against the rotor by way of both the ratio of the lever and advancement of the adjusting spindle as it turns under the influence of the spindle driver 22. Displacement of the running clearance element 44 relative to the mounting plate 38, from the position shown in FIG. 6 to the position shown in FIG. 8, will occur, but will terminate upon the engagement of the adjuster pin 42 with an end of the slot 56, as represented in FIG. 8. This engagement is intended to be coincident with travel of the brake pad through the pad running clearance or, in other words, with brake pad to brake rotor contact.

Figure 13:
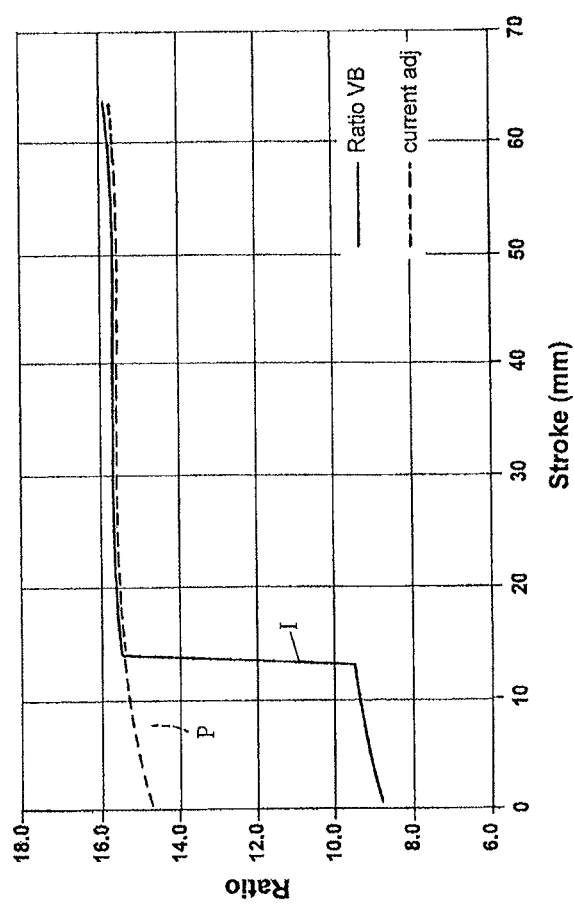
FIG. 13 is a graph comparing the improved ratio of pushrod displacement, or stroke, to clearance take-up properties supplied by the present invention with typical ratio to clearance take-up properties of a conventional system.

The spindle driver 22 and its associated adjusting spindle in this way will provide the overall disc brake assembly with a clearance take-up action having a pushrod displacement to clearance take-up ratio that is lower numerically than that produced when utilizing just a brake actuation lever alone. It is desired to have a low ratio during the clearance take-up phase, as this reduces the amount of brake chamber stroke for given amount of pad-to-rotor clearance. While lever ratios today are nominally 15.6 to 1, with an arrangement such as that of the present invention, during the clearance take-up phase, the ratio is lowered to a 9 to 1 or 10 to 1 range for rapid clearance take-up. This reduces the amount of brake chamber stroke for a given clearance, or permits increasing the running clearance by about 30% to 40%, for a given brake chamber stroke. Thus, for example, an adjuster that, today, has an approximately 15 to 1 ratio at the beginning of the chamber stroke might have 0.85 mm of clearance stroke at 13 mm chamber stroke. The new variable ratio, also at a 13 mm stroke, could take up 1.4 mm of pad clearance. The available increase in running clearance reduces the possibility of brake wear issues associated with tight running clearances. FIG. 13 provides an illustration of the improved ratio of pushrod displacement, or stroke, to clearance take-up properties supplied by the present invention, assuming a pad clearance of 1.4 mm. The curve "I" represents performance according to the present invention, while the curve "P" represents performance according to an adjuster now in use.

During operation, once the brake pads press against the disc brake rotor, the load on the threaded adjusting spindle increases the friction between the spindle and the bridge relative to which the spindle rotates. This increases the loads on the adjuster arm and the input element 32. When the load input to the element 32 exceeds the preload supplied by the torsion spring 28, the element 32 will rotate, relative to the insert 34, the stem 36, the spindle driver 22, and the adjusting spindle, about its pivot center on the axis of the stem 36. Rotation of the element 32 against the bias applied by the torsion spring 28 causes the pin 80, secured to the insert 34 and the bushing 78, to travel within the slot 33, as is evident from a comparison of FIGS. 7 and 9. This action allows the adjusting spindle to stop rotating without overstressing the various connections between the actuator pushrod, the adjuster arm, and the input element 32, since the torsion spring 28 absorbs the lost motion and prevents overloading of the adjuster arm. The length of the slot 33 should be sufficient to prevent the pin 80 from contacting the other end of the slot. After the pin 80 completes its travel within the slot 33, the overall pushrod displacement to clearance take-up ratio returns to its nominal 15.6 to 1 value. On the return stroke, the torsion spring 28 returns the pin 80 to its original position at the edge of the slot 33.

Upon brake release, once the adjuster arm and the input element 32 return to the point at which there is essentially no longer a load caused by the brake pads pressing against the rotor, the ratio returns to 9 to 1, and the pad clearance is rapidly restored to the original value.

Figure 10:
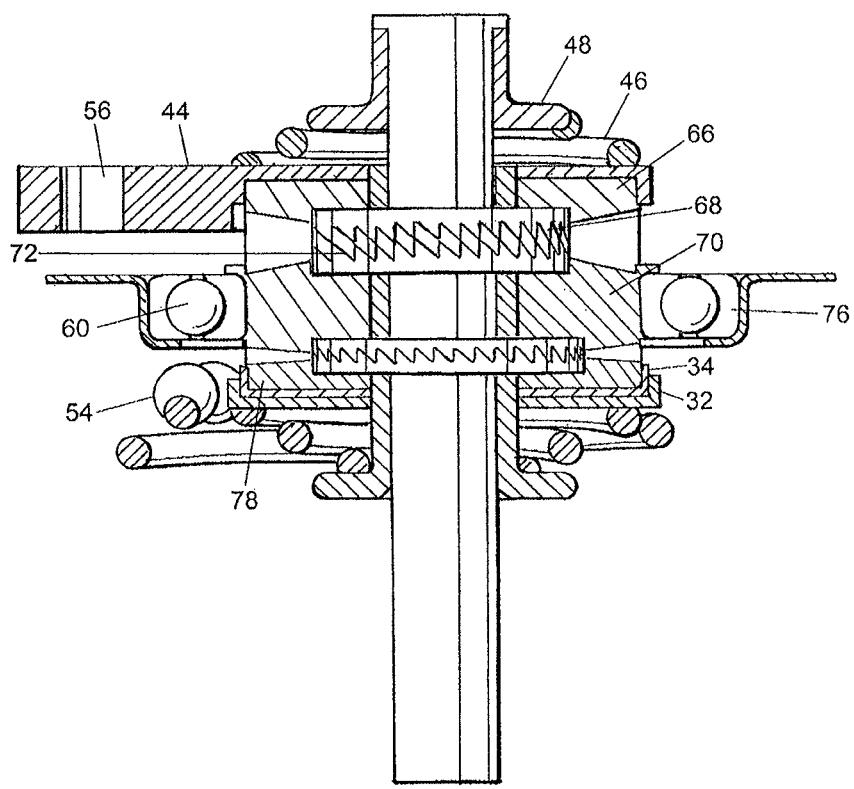
FIG. 10 illustrates the manner in which components of the ratchet arrangement of the invention cooperate when wear adjustment is initiated.

The wear adjuster 20 will enter a brake wear adjustment or compensation phase if the clearance between the brake pad and the rotor is greater than desired. In the brake wear adjustment phase, the adjuster 20 will automatically compensate to bring the excessive clearance mentioned into the design range. Until the running clearance element 44, to which the first ratchet bushing 66 is fixed, rotates enough so that an end of the slot 56 contacts the adjuster pin 42, the entire ratchet arrangement 40 rotates through the same angle as the input element 32. Once contact between the pin 42 and the end of the slot 56 occurs, however (FIG. 8), further rotation of the element 44 and the bushing 66 is prevented by the pin 42. The input element 32 continues to rotate, and brings with it the insert 34 and the third ratchet bushing 78, once the lost motion has been absorbed, so that the teeth 68 of the ratchet bushing 66 begin to ride up the corresponding middle bushing teeth 72 against the bias applied by the cone spring 46, as illustrated in FIG. 10. If the travel of the teeth 68 relative to the teeth 72 is sufficient to permit the teeth 68 to ride over the peaks of the teeth 72, the first ratchet bushing 66 is re-indexed by one tooth, and will not return to its original position, to initiate wear adjustment.

Figure 11:
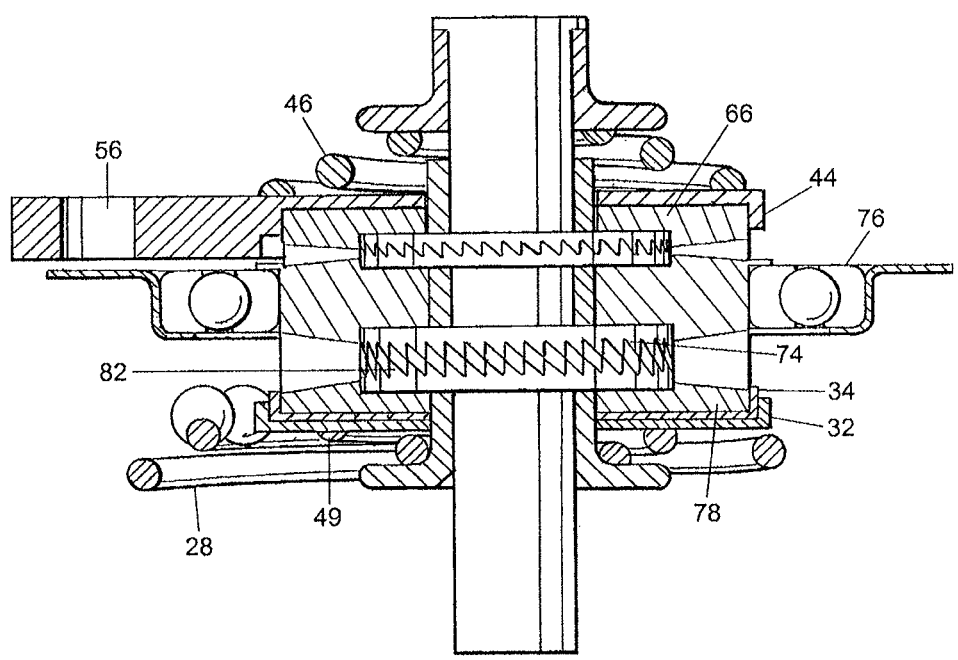
FIG. 11 is a view similar to FIG. 10, but showing the components as wear adjustment approaches completion.

When the brake is released and the load on the adjusting spindle is removed, the first ratchet bushing 66 begins to turn backwards. Once the lost motion is again available, and the other end of the slot 56 again contacts the adjuster pin 42 (FIG. 6), the backing off of the adjusting spindle stops. Together with the third ratchet bushing 78, the pin 80, and the insert 34, the input element 32 continues to return toward its original position, shown in FIG. 7. As this occurs, the teeth 82 of the third ratchet bushing 78 begin to ride up the corresponding middle bushing teeth 74 against the bias applied by the cone spring 49, as illustrated in FIG. 11. The travel of the teeth 82 relative to the teeth 74 will be sufficient to permit the teeth 82 to ride over the peaks of the teeth 74, and the third ratchet bushing 78 is re-indexed by one tooth to complete wear adjustment.

The third ratchet bushing 78 will index relative to the first ratchet bushing 66 the same amount as the first ratchet bushing 66 indexes upon brake application. The teeth 82 have the same pitch as the teeth 68, but the tops of the teeth 82 are modified to ensure that the third ratchet bushing 78 indexes the same amount as the first ratchet bushing 66. Indexing of the third ratchet bushing 66 in this way permits full return of the third bushing 66 to its original position after adjustment.

Figure 12:
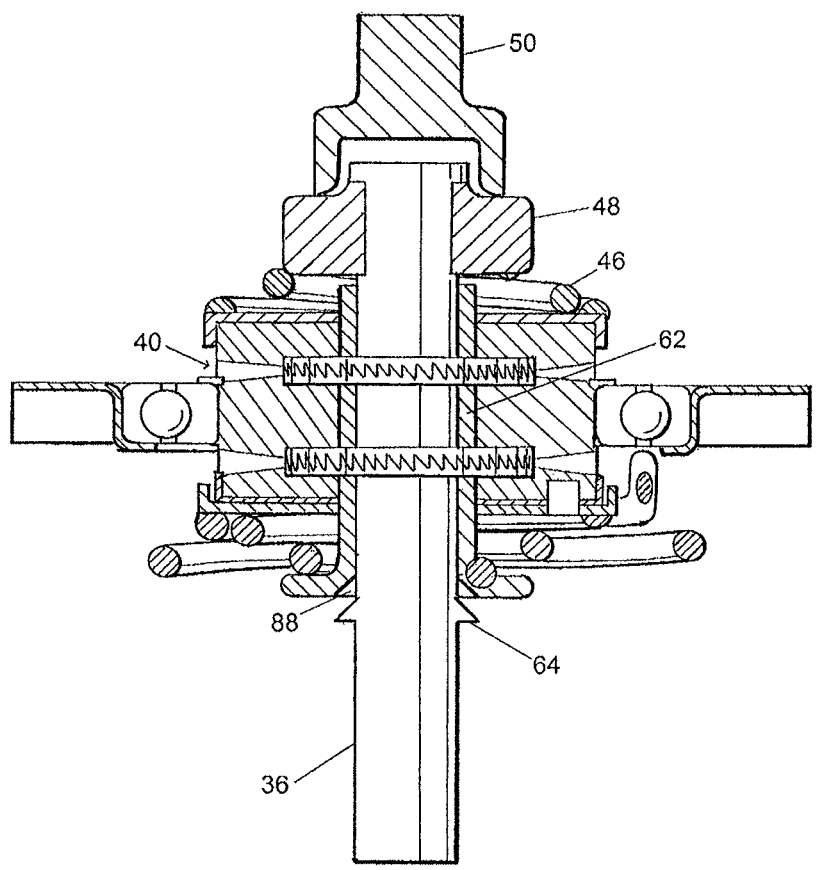
FIG. 12 is a view of part of the adjuster undergoing manual adjustment to permit brake pad inspection, removal, and replacement.

Manual adjustment to permit large pad clearances for brake pad inspection, removal, and replacement is accomplished without turning elements of the ratchet arrangement 40. As shown in FIG. 12, instead, the cam driver 50 is engaged by a technician or automatically, and the T-cap abutment 48 and the stem 36 are pressed axially against the bias supplied by the cone spring 46 to displace the stem teeth 64 out of corresponding recesses 88 in the adjacent end of the middle ratchet tube 62. Pushing the stem 36 axially to disengage the teeth 64 and the recesses 88 operates to disengage the cone lock 58 (FIG. 2), and, at this point, free turning of the stem 36 relative to the middle ratchet tube 62 can occur, under the action of the cam driver 50, without the need to re-index the bushings of the ratchet arrangement 40. When the axial force on the shaft abutment 48 is released, the cone spring 46 returns the stem 36 back to its prior position and re-engages the cone lock 58.

To prevent the adjuster shaft from turning without first disengaging the cone lock, the cam driver 50 is preferably a two-way driver, which is rotated so that a cam inside of the driver exterior displaces the stem downward to disengage the cone lock 58. Once turning torque is removed from the cam driver with such an arrangement, the stem will return to a position engaging the cone lock 58.

By way of the present disc brake wear adjustment mechanism, an increase in brake pad to rotor running clearance is produced while eliminating the need to increase the brake chamber stroke at the same time to achieve necessary brake torque. The adjuster is supplied with non-linear travel to both advance brake pads more quickly upon initial brake application and produce brake pad movement more like brakes in use today after the initial brake application. Utilizing the ratchet-and-pawl style adjuster of the present invention in place of a typical one-way bearing style adjuster now in use should result in an arrangement that is less susceptible to auto-adjustment in high vibration situations.

The dual ratio actuator of this invention provides improvements in running clearance and reserve stroke with minimal changes to brake lever and caliper features. Adjustment in discreet increments according to the invention provides improved immunity to micro-movements and vibration. The input overload protection supplied by the lost motion arrangement, moreover, operates to protect the adjuster components from high loads.

The ratchet arrangement is protected from excessive wear and overloads, as well as disengagement during manual adjustment, by the compressible cone springs, and the one way ratchets, compression springs, and overload torsion spring of the invention collectively provide for a low cost, simple design. An operational means for maintaining a wider air gap is provided, with a predetermined gap setting a running clearance for fast take-up, and the adjusting spindle moving with the lever at the same time. After contact, the arrangement goes to normal advancement and maintains a larger air gap. Finally, those familiar with brake disc technology will also recognize that an optional electric motor drive could be used in place of or as a supplement to manual adjustment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wear adjuster securable to disc brake caliper structure comprising:
    a stem extending along an axis about which the stem is rotatable in opposite directions,
    a spindle driver securable to an axial end of the stem to transmit rotational motion of the stem,
    an input element receiving input force supplied to the wear adjuster to produce rotation of the stem,
    a running clearance element rotatable together with the input element to a limited extent,
    a ratchet arrangement located between the input element and the running clearance element, the ratchet arrangement initiating any necessary adjustment for wear after rotation of the input element beyond the limited extent and completing any necessary adjustment for wear during return rotation of the input element, and
    a lost motion connection defined between the ratchet arrangement and the input element to avoid transmitting an excessive amount of the input force received by the input element.

2. The wear adjuster according to claim 1, wherein the ratchet arrangement includes at least one middle bushing disposed between opposing bushings that are displaceable axially relative to the stem.

3. The wear adjuster according to claim 2, wherein teeth of the opposing bushings are spring biased into engagement with teeth on opposite sides of the middle bushing.

4. The wear adjuster according to claim 3, wherein teeth in facing teeth sets are configured to permit one way indexing.

5. The wear adjuster according to claim 1, wherein the limited extent is defined by movement of a pin within a slot defined in the running clearance element.

6. The wear adjuster according to claim 5, further comprising a mounting plate by which the wear adjuster is securable to the disc brake caliper structure.

7. The wear adjuster according to claim 6, wherein the pin is secured to the mounting plate.

8. The wear adjuster according to claim 1, wherein the lost motion connection is provided by an arrangement including a pin and a slot.

9. The wear adjuster according to claim 8, further comprising a torsion spring opposing relative movement of the pin and the slot upon disc brake actuation.

10. The wear adjuster according to claim 1, wherein the stem is axially displaceable relative to the ratchet arrangement to unlock the stem for free stem rotation.

11. A disc brake caliper component having a wear adjuster secured thereto, the wear adjuster comprising:
    a stem extending along an axis about which the stem is rotatable in opposite directions,
    a spindle driver securable to an axial end of the stem to transmit rotational motion of the stem,
    an input element receiving input force supplied to the wear adjuster to produce rotation of the stem,
    a running clearance element rotatable together with the input element to a limited extent,
    a ratchet arrangement located between the input element and the running clearance element, the ratchet arrangement initiating any necessary adjustment for wear after rotation of the input element beyond the limited extent and completing any necessary adjustment for wear during return rotation of the input element, and
    a lost motion connection defined between the ratchet arrangement and the input element to avoid transmitting an excessive amount of the input force received by the input element.

12. The disc brake caliper component according to claim 11, wherein the ratchet arrangement includes at least one middle bushing disposed between opposing bushings that are displaceable axially relative to the stem.

13. The disc brake caliper component according to claim 12, wherein teeth of the opposing bushings are spring biased into engagement with teeth on opposite sides of the middle bushing.

14. The disc brake caliper component according to claim 13, wherein teeth in facing teeth sets are configured to permit one way indexing.

15. The disc brake caliper component according to claim 11, wherein the limited extent is defined by movement of a pin within a slot defined in the running clearance element.

16. The disc brake caliper component according to claim 15, further comprising a mounting plate by which the wear adjuster is securable to the disc brake caliper structure.

17. The disc brake caliper component according to claim 16, wherein the pin is secured to the mounting plate.

18. The disc brake caliper component adjuster according to claim 11, wherein the lost motion connection is provided by an arrangement including a pin and a slot.

19. The disc brake caliper component according to claim 18, further comprising a torsion spring opposing relative movement of the pin and the slot upon disc brake actuation.

20. The disc brake caliper component according to claim 11, wherein the stem is axially displaceable relative to the ratchet arrangement to unlock the stem for free stem rotation.

* * * * *